H. J. NEFF.
ATTACHMENT FOR CORN CULTIVATORS.
APPLICATION FILED FEB. 10, 1909.
928,146.
Patented July 13, 1909.
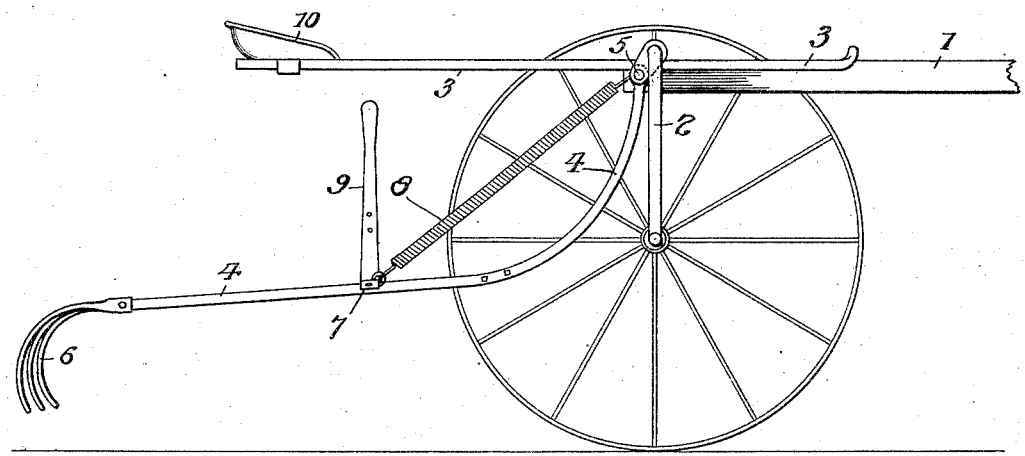
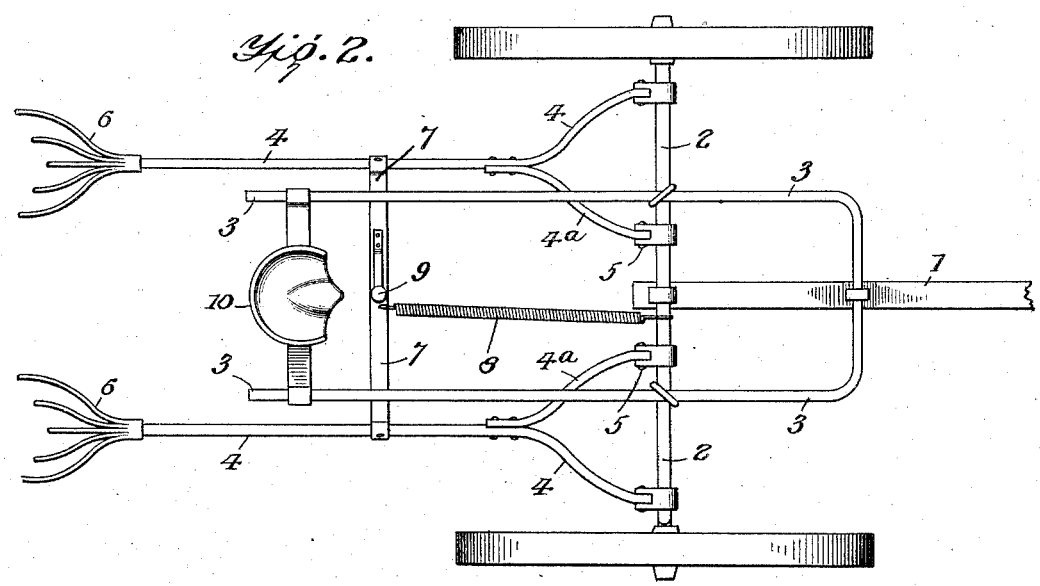
WITNESSES
INVENTOR
HARDIN J. NEFF,
BY
ATTORNEYS

UNITED STATES PATENT OFFICE.

HARDIN J. NEFF, OF STANFORD, ILLINOIS.

ATTACHMENT FOR CORN-CULTIVATORS.

No. 928,146.	Specification of Letters Patent.	Patented July 13, 1909.

Application filed February 10, 1909. Serial No. 477,262.

*To all whom it may concern:*

Be it known that I, HARDIN J. NEFF, a citizen of the United States, residing at Stanford, in the county of McLean and State of Illinois, have invented an Improved Attachment for Corn-Cultivators, of which the following is a specification.

My invention is a cultivating implement designed and adapted to be used as an adjunct or attachment of a cultivator having plows or shovels for furrowing between rows of young corn growing in hills or drills.

The details of construction, arrangement, and operation of the implement are as hereinafter described, and illustrated in the accompanying drawing in which—

Figure 1 is a side elevation of one form of the same, one of the wheels of the cultivator proper being removed. Fig. 2 is a plan view of the implement as shown constructed in Fig. 1.

1 indicates the tongue or pole, 2, the upwardly bent beam or axle, and 3, the frame, of a corn-cultivator proper. The cultivating plows or shovels ordinarily employed and constituting the main feature of cultivators of this class, are omitted.

Figs. 1 and 2 represent the double form of my improved attachment. That is to say, two bars 4 are hinged, at 5, to the axle 2, and curved downwardly and also laterally and extended rearward, where they are provided with claws or hooks 6, the same being preferably formed of round tines curved similarly to the teeth of the ordinary wire-tooth rake. In order to prevent lateral movement of the bars 4, their front ends being curved laterally and provided with lateral braces 4ª and journaled on the axle 2. Thus the said bars 4 are adapted to swing vertically, but are braced laterally so as to remain parallel, and at right angles to the axle. The bars 4 are also rigidly connected by means of a cross-bar 7. In order to hold the hooks 6 normally elevated, or removed from the ground as shown in Fig. 1, I provide a coiled spring 8, which extends between the axle 2 and the cross-bar 7. To the central portion of the cross-bar 7 there is attached a vertical handle 9, which is located just forward of the driver's seat 10, and extends upward into convenient proximity thereto so that the driver may easily grasp the handle when required.

The operation of the implement is as follows: Upon the driver perceiving that one or more hills of young corn are covered more or less with dirt thrown up by the cultivating plows or shovels, or that more or less trash rests on the corn, he seizes the handle 9 and forces the bars 4 down, against the tension of the spring 8, so that the hooks 6 pass through and over the corn and remove the dirt or trash which would otherwise injure or kill the corn. Upon removing the downward pressure, the spring 8 automatically raises the bars 4 with their attached hooks to the position indicated in Fig. 1, and the attachment is thus held or supported until again required for use.

What I claim is:

The combination, with the axle of a wheel-cultivator and frame 3—3 extended rearwardly therefrom for supporting a driver's seat, of the improved attachment for removing dirt and trash from young corn, comprising parallel bars 4 having tines and made forked at their front ends which are hinged on the axle, a cross-bar 7 rigidly connecting said bars 4, a vertical handle attached to the cross-bar centrally and extending upward at a point in front of the rear ends of the frame, and a supporting spring extending between the axle and the middle of the cross-bar and serving to normally support the bars 4, as shown and described.

HARDIN J. NEFF.

Witnesses:
J. H. LAND,
J. M. KEARBY.